United States Patent [19]

Bell et al.

[11] 4,167,276
[45] Sep. 11, 1979

[54] SELF-CONTAINED AIR BAG SYSTEM

[75] Inventors: Lon E. Bell, Altadena; Brian K. Hamilton; William R. Dickie, both of Canyon County, all of Calif.; Robert M. Wulbrecht, Utica; Donald G. Radke, Mt. Clemens, both of Mich.

[73] Assignee: Allied Chemical Corporation, Morris Township, Morris County, N.J.

[21] Appl. No.: 751,858

[22] Filed: Dec. 17, 1976

[51] Int. Cl.² ............................................. B60R 21/08
[52] U.S. Cl. ................................. 280/731; 200/61.53; 222/5
[58] Field of Search ................................. 280/729–741; 116/114 AH; 200/143 R, 61.53, 153 R; 73/492; 138/68 R; 222/3, 5; 9/316

[56] References Cited
U.S. PATENT DOCUMENTS

| 3,452,175 | 6/1969 | Wilkes | 200/153 R |
| 3,532,360 | 10/1970 | Leising et al. | 280/736 |
| 3,601,081 | 8/1971 | Smith et al. | 280/734 |
| 3,655,928 | 4/1972 | Engel | 280/735 X |
| 3,688,063 | 8/1972 | Bell | 200/61.53 |
| 3,819,203 | 6/1974 | Radke et al. | 280/731 |
| 3,827,715 | 8/1974 | Lynch | 280/731 |
| 3,982,774 | 9/1976 | Ivashuk | 280/731 X |

*Primary Examiner*—David M. Mitchell
*Attorney, Agent, or Firm*—Roger H. Criss

[57] ABSTRACT

The air bag safety system is a self-contained, modular apparatus including: an inflatable bag, an inflating unit connected to the bag, and a sensor. The inflating unit provides gas for inflating the bag. The sensor is disposed adjacent to the apparatus and is responsive to a predetermined level of deceleration of a vehicle for activating the inflating unit. The system also includes a fail-safe interlock to prevent the sensor from activating the inflating unit when the system is not properly mounted or internal parts fail in service.

14 Claims, 10 Drawing Figures

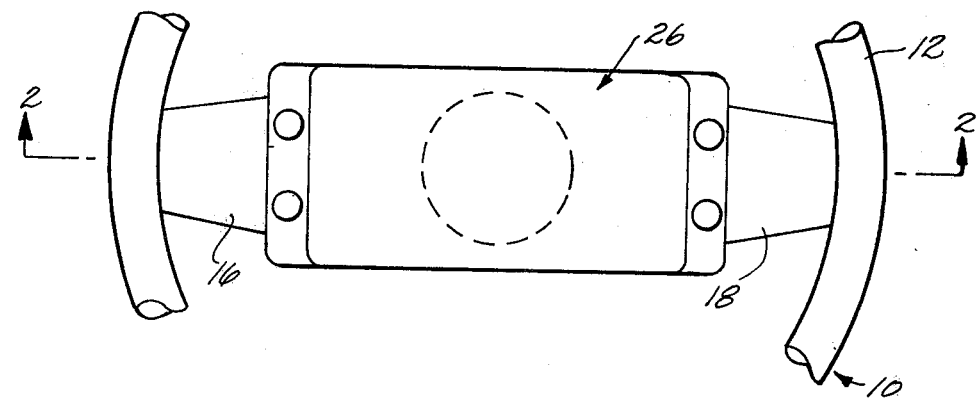
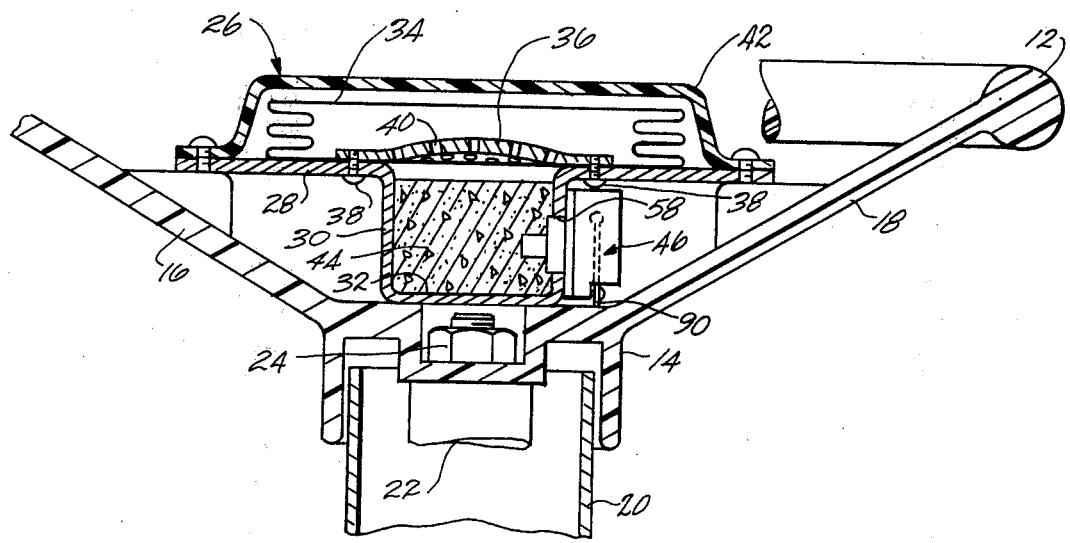

SELF-CONTAINED AIR BAG SYSTEM

BACKGROUND OF THE INVENTION

The invention relates to air bag safety restraint system for a vehicle, such as an automobile, and more particularly to an integral, modular, self-contained air bag system.

It has long been recognized that restraint systems in vehicles, such as automobiles, enhance passenger safety in collision situations. One such retraint system uses an inflatable air bag which inflages rapidly in an emergency situation, such as a crash, to provide a cushion between the occupant (driver or passenger) and the interior of the automobile to absorb the impact. While the effectiveness of air bags as a passive retraint has been amply demonstrated, air bags have not found general acceptance for use in automobiles because of overall costs of manufacture and installation and because of concerns about possible malfunction in which the air bag itself could cause an accident.

The present invention is directed to an improved air bag system which is a self-contained, integral, modular unit that can easily be mounted in the automobile, such as on the steering wheel or on the dash board. The system does not require a remote crash sensor, such as on the front bumper. The system requires no external connections between the unit and the electrical system of the automobile.

A self-contained air bag system of different design is disclosed in U.S. Pat. No. 3,625,541 to Frazier and in patents cited during prosecution of the Frazier patent in the U.S. Patent Office. Generation of an inflating gas by a chemical reaction is disclosed in U.S. Pat. Nos. 3,827,715 to Lynch; 3,895,823 to R. L. Stephenson; 3,891,233 to Damon; 3,733,180 to Hernect; and 3,618,980 and 3,618,981 to Leising. Sensors are disclosed in U.S. Pat. Nos. 3,812,726; 3,688,063; RE 28,251 and 3,889,232 to L. Bell; 3,452,175; 3,452,309; 3,471,688; and 3,572,141 to D. Wilkes; and 3,567,881 to F. Dulmstra.

SUMMARY OF THE INVENTION

The present invention provides an air bag safety apparatus in the form of an integral, modular self-contained unit which can be secured to a support inside a vehicle, such as a steering wheel of an automobile. The apparatus includes: a mounting member for attaching the apparatus to the support, a container secured to the mounting member, an inflatable bag disposed in the container, and an inflating unit connected to the bag for providing gas to inflate the bag. The apparatus also includes a sensor disposed adjacent to the apparatus and responsive to a predetermined level of deceleration of the vehicle for actuating the inflating unit. The apparatus may also include an interlock system which automatically arms the apparatus when it is properly mounted. In addition, the sensor may include fail-safe means which prevent it from being activated by failure or malfunction of the mechanism.

DESCRIPTION OF THE DRAWINGS

FIG. 1 is a plan view of a preferred embodiment of the invention.

FIG. 2 is an enlarged sectional view taken substantially along the line 2—2 of FIG. 1.

DETAILED DESCRIPTION

Figure 3:
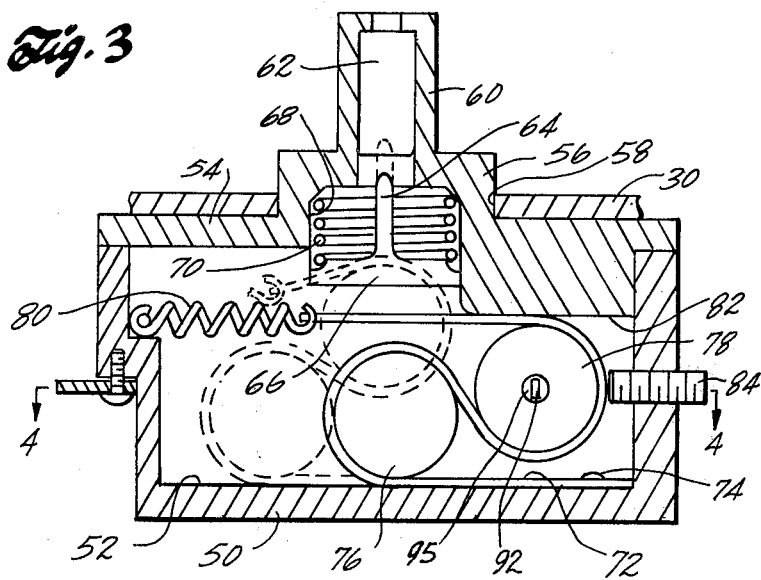
FIG. 3 is a sectional view of a first embodiment of a sensor used in the safety system of FIGS. 1 and 2.

Referring to FIGS. 1 and 2, the air bag safety system of the present invention may be mounted on the steering wheel, indicated generally at 10, of a vehicle. The steering wheel 10 includes an outer rim 12, a central hub section 14, and a pair of diametrically opposed radial spokes 16 and 18. The hub section 14 extends around a steering column 20. The central portion of the hub 14 is bolted or otherwise secured to the end of a steering shaft 22 by means of a nut 24 in a conventional manner.

The air bag safety system of the present invention, indicated generally at 26, is mounted within the rim of the steering wheel directly over the central hub 14. The safety system includes a frame plate 28 having a cylindrical cup-shaped portion 30 in the center. The outer ends of the frame plate 28 (mounting member) are bolted or otherwise secured to the steering spokes 16 and 18 (support means) in any suitable manner, with the bottom 32 of the cup-shaped portion 30 resting against the central hub 14.

A folded, inflatable air bag 34 has a mount forming a circular opening which is sealed to the frame plate 28 around the top of the cup-shaped portion 30. A diffuser plate 36 extends across the top of the cup-shaped portion 30. The air bag 34 is clamped securely around the margin of the mouth of the bag to form a seal between the diffuser plate 36 and the frame plate 28. The diffuser plate is held in place by a plurality of screws 38. The central portion of the diffuser plate 36 extending over the cup-shaped portion 30 is provided with a plurality of small openings 40. A suitable cover 42 made of a fragible plastic material encloses and forms a container for the folded air bag 34, and protects the folded air bag 34 to prevent damage to the bag when it is in its stored, uninflated condition.

The cup-shaped portion 30 contains part or all of the inflating means. Preferably, the inflating means generates the inflating gas by a chemical reaction. For example, the cup-shaped portion may be filled with a gas generating material, such as sodium azide, or a pyrotechnic formulation such as that described in U.S. Pat. Nos. 3,950,009; 3,901,747; or 3,897,285. Sodium azide material is stable over a wide range of temperatures, but when heated above 700° C., rapidly decomposes, releasing a large volume of nitrogen gas. However, the present invention in no ways is limited to a specific material used for generating gas. Alternatively, the inflating unit may use other forms of pyrotechnic gas generators, or a high pressure gas reservoir, or a hybrid system which combines compressed gases with a gas generator. Alternate systems are described in U.S. Pat. Nos. 3,901,530; 3,895,821; 3,895,823; 3,837,671; 3,819,203 and 3,786,843.

Figure 4:
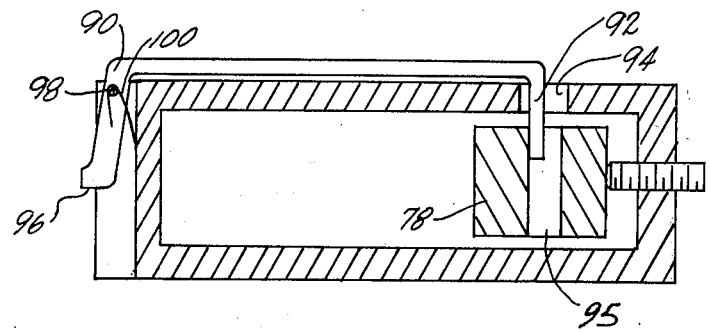
FIG. 4 is a sectional view taken substantially on the line 4—4 of FIG. 3.

The gas generating source 44 is ignited in response to a crash sensing element 46 mounted on the side of the cup-shaped portion 30 of the frame plate 28. The sensor 46 may take a variety of forms in which a housing containing an inertial element, in response to a decelerating force having a component acting along the axis of the steering column, produces relative movement between the inertial element and the housing, moving relative to the housing with sufficient energy to trigger means for igniting the gas generator source. A first embodiment sensor unit is shown in detail in FIGS. 3 and 4.

The sensor 46 includes a housing 50 having a hollow interior forming a first flat interior surface 52. The housing 50 has an opposite wall 54 which includes a hollow cylindrical portion 56 designed to press-fit or otherwise be secured in a hole 58 in the side of the cup-shaped portion 30 of the frame plate 28 with the surface 52 extending parallel to the axis of rotation of the steering wheel. A tubular portion 60 projects from the end wall of the cylindrical portion 56 and contains a primer/initiator 62. Tubular portion 60 is preferably open on the end and projects into the material forming the gas generating source 44. A firing pin 64 projecting from a disc 66 is supported in a bore 68 within the cylindrical portion 56 by a coil compression spring 70.

The sensor 46 element is a rolamite unit which includes an elongated spring band 72 secured at one end against the surface 52 by a screw or pin 74. The band extends around the first cylindrical roller 76 and in a reverse bend around a second cylindrical roller 78. A tension spring 80 secures the other end of the band 72 to the housing 50, with the band 72 maintained under tension by the spring. The tension in the band presses the band against a second interior flat surface 82 extending parallel to the surface 72. By shaping the band in the manner described in detail in U.S. Patent Re 28,251, the spring band 72 produces a net force on the rollers 76 and 78, urging them against an adjustable stop in the form of a calibration screw 84. Any force acting on the rollers in the direction of the arrow such as deceleration of the vehicle above a predetermined amount, causes the rollers to overcome this net force produced by the band 72, causing the rollers to move to the left as viewed in FIG. 3. If the force is of sufficient magnitude and sustained for a sufficient period of time, the rollers will move to the dotted position in which the tension on the band produced by the spring 80 causes the roller to move upwardly against the disc 66, thereby forcing the firing pin 64 into firing engagement with the primer/initiator 62. This initiates the chemical reaction in the gas generator source 44, releasing gas in sufficient quantity to inflate the air bag 34, causing the air bag to break out of the cover 42 and expand into the passenger compartment.

One of the features of the present invention is a safety interlock arrangement which prevents the rollers 76 and 78 from moving inadvertently when the safety unit is not in use. The interlock is automatically released when the safety unit is mounted in position on the steering wheel, as shown in FIG. 2. The safety interlock includes a generally L-shaped lever 90, one leg of which extends along the outside of the sensor housing 50 and terminates in a projecting pin 92 which extends through an opening 94 in the housing. The pin 92 is sufficiently long to project into an opening 95 extending through the center of the roller 78. The outer leg of the L-shaped safety lever terminates in a projection 96 which is positioned to engage the hub portion of the steering wheel when the safety system is properly mounted. The L-shaped lever 90 is pivotally supported by a pin 98 so that a pressure against the projection 96 causes the lever to pivot in a direction to withdraw the pin 92 from the hole 95 in the roller 78. A wire coil spring 100 wrapped around the pivot pin 98 normally urges the pin 92 down into the hole 95 to lock the roller 78. When the safety unit is in position against the hub of the steering wheel, the action of the spring 100 is overcome and the pin 92 is automatically withdrawn, freeing the rollers 76 and 78 to move in the manner described above. When the unit is dismounted, the pin 92 automatically locks the roller 78 again.

The sensor element as described, in addition to the safety pin arrangement for automatically arming the unit when it is mounted in proper position, has other fail-safe features to its design. If the band 72 should break, for example, or the tension spring 80 fail, the sensor automatically becomes inoperative and there can be no firing of the primer/initiator 62. It should be noted that the guide surfaces 52 and 82 for the rollers are aligned parallel to the axis of rotation of the steering shaft so that the sensor is unaffected by the angular position of the steering wheel in sensing a crash condition.

From the above description, it will be seen that a completely self-contained safety device is provided which is modular in form and which can be readily mounted directly on the steering wheel. The energy for releasing the gas from the gas generator source is stored in the form of tension in the spring 80 and in the form of chemical energy in the primer/initiator 62.

Figures 5, 6:
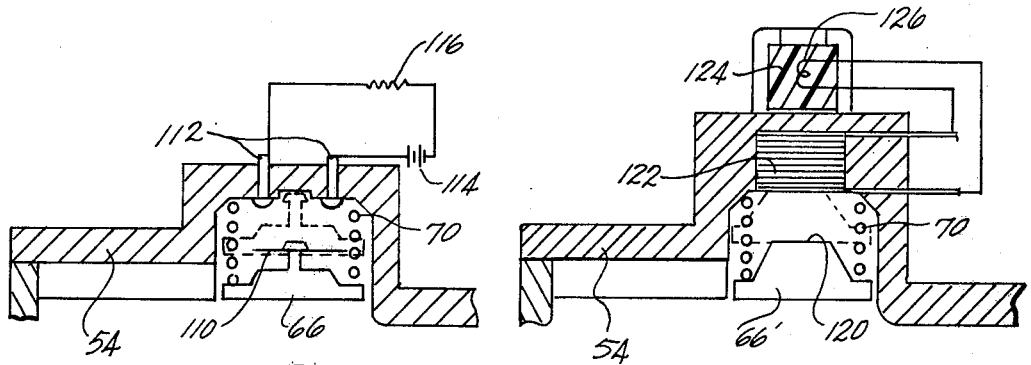
FIG. 5 is a sectional view of a second embodiment of the sensor of FIG. 3.
FIG. 6 is a sectional view of a third embodiment of the sensor of FIG. 3.

While the use of a primer/initiator which is triggered by a mechanical impact is preferred, it will be understood that a second embodiment of sensor having a bridge wire initiator may be used. If such a hot wire initiator is employed, a separate battery for providing electrical energy to the hot wire is required. A battery having a long shelf life can be mounted as part of the safety unit. The hot wire initiator can then be triggered from the battery by means of a switch, such as shown in FIG. 5. In the second embodiment of FIG. 5, the disc 66 moves a contact spring 110 into contact with a pair of switch pins 112. Thus a circuit is completed between a battery 114 and a hot wire 116 in the initiator.

Rather than utilizing a separate battery, the electrical energy to trigger the bridge wire initiator may be generated in a third embodiment by a piezoelectric stack or electromagnetic coil. As shown in FIG. 6, the third embodiment has a disc 66' which is modified to have a larger mass and provide a substantially flat surface 120. When the disc 66' is moved by the rollers against the spring 70, it impacts a stack of piezoelectric crystals, indicated at 122. The piezoelectric crystals under the impact of the disc 66' provide sufficient electrical energy to fire an initiator 124 by means of a hot wire 126 connected across the piezoelectric crystal stack 122.

Figure 7:
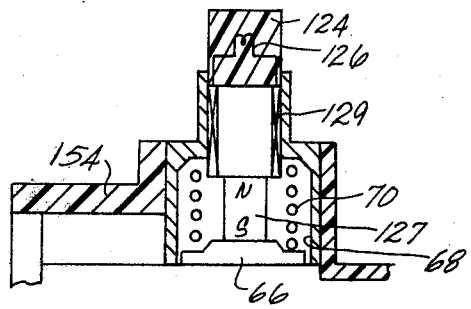
FIG. 7 is a sectional view of a fourth embodiment of the sensor of FIG. 3.

Referring to FIG. 7, a fourth embodiment of the sensor utilizes an electromagnetic generator for firing the pyrotechnic device. This is accomplished by mounting a permanent magnet 127 on the disc 66. A wire coil 129 is axially aligned with the magnet so that when the disc is moved by the roller 78 in the manner described above in connection with FIG. 3, the magnet 127 advances into the center of the coil 129, generating a current through the hot wire 126 to fire the pyrotechnic device 124. The portion of the housing 154 which surrounds the coil and forms the bore 68 is preferably made of ferromagnetic material to provide a low reluctance magnetic path for the flux from the magnet 127.

Figure 8:
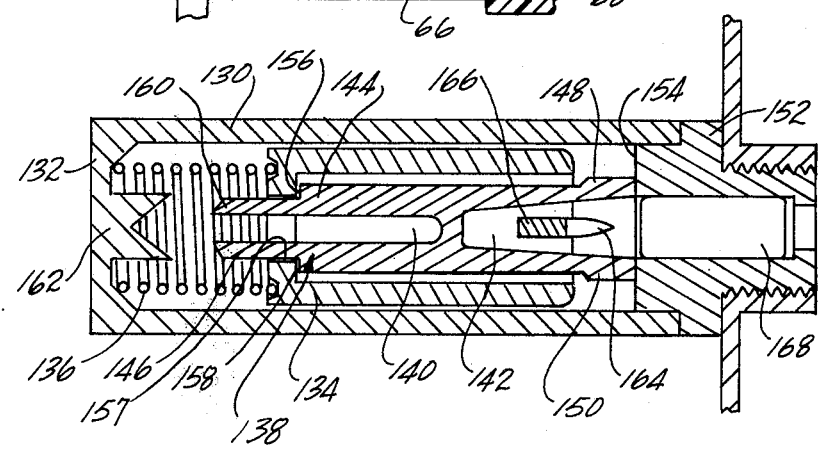
FIG. 8 is a sectional view of a fifth embodiment of the sensor of FIG. 3.

Referring to FIG. 8, a fifth embodiment of sensor element which includes a tubular housing 130 having an end wall 132. Slidably mounted within the tubular housing 130 is an annular bushing 134. A compression spring 136 engages the end of the bushing 134 urging it away from the end wall 132 of the housing. Concentrically positioned inside the annular bushing 134 is a latch member 138 in the form of a shaft which is slotted at either end, as indicated at 140 and 142. The slot 140 forms a pair of fingers 144 and 146. The slot 142 forms a pair of fingers 148 and 150. A mounting plug 152 is inserted in the end of the tubular housing 130 forming an inner wall 154 which is engaged by the ends of the fingers 148 and 150. The fingers 144 and 146 are formed with a shoulder 156 and 158, respectively, which engage a lip 157 on the end of the bushing 134. The spring 136 holds the lip against the shoulders 156 and 158, thereby urging the latching member 138 toward the plug 152.

The ends of the fingers 144 and 146 are tapered at the ends, as indicated at 160. Any sudden deceleration of the housing 130 allows the inertial mass of the bushing and latch member to compress the spring 136, bringing the tapered ends 160 into engagement with a tapered V-shaped wedging member 162 projecting from the end wall 132. The wedging action of the impact between the latching member 138 and the wedging member 162 forces the fingers 144 and 146 to move together. This causes the shoulders 156 and 158 to disengage from the lip 157 on the end of the bushing, thereby releasing the bushing to move relative to the latching member 138 under the urging of the spring 136. A firing pin 164 is positioned in the slot 142 and is supported from the bushing 134 by a supporting cross bar 166. The firing pin 164, on release of the bushing from the latch member 138, is brought into contact with a primer/initiator 168 mounted in the plug 152. By mounting the sensor unit in the bottom of the cup-shaped portion 30 in which the chemical gas generating source is located, the primer/initiator, when fired, ignites the gas generating source to inflate the air bag in the manner described above.

The sensor of FIG. 8 is inherently fail-safe in that the spring 136 in the initial condition shown in the drawing does not store sufficient energy to activate the primer, even if the latch should fail to hold the bushing in place. Only when the spring 136 is compressed by the inertia of the combined mass of the bushing and the latching member during a crash does the spring 136 become fully compressed and store sufficient energy to drive the bushing and firing pin with great enough force to activate the primer. Thus there is no way for the primer to be fired except by the cocking and subsequent release action experienced on impact in a crash situation.

The sensor of FIG. 8, like the sensor of FIGS. 3–7, do not require connection to any external unit or power source, and therefore can be considered self-energized. Only the deceleration of the sensor through the mounting for the air bag unit is needed to activate the unit. Thus the air bag unit is completely self-contained.

Figure 9:
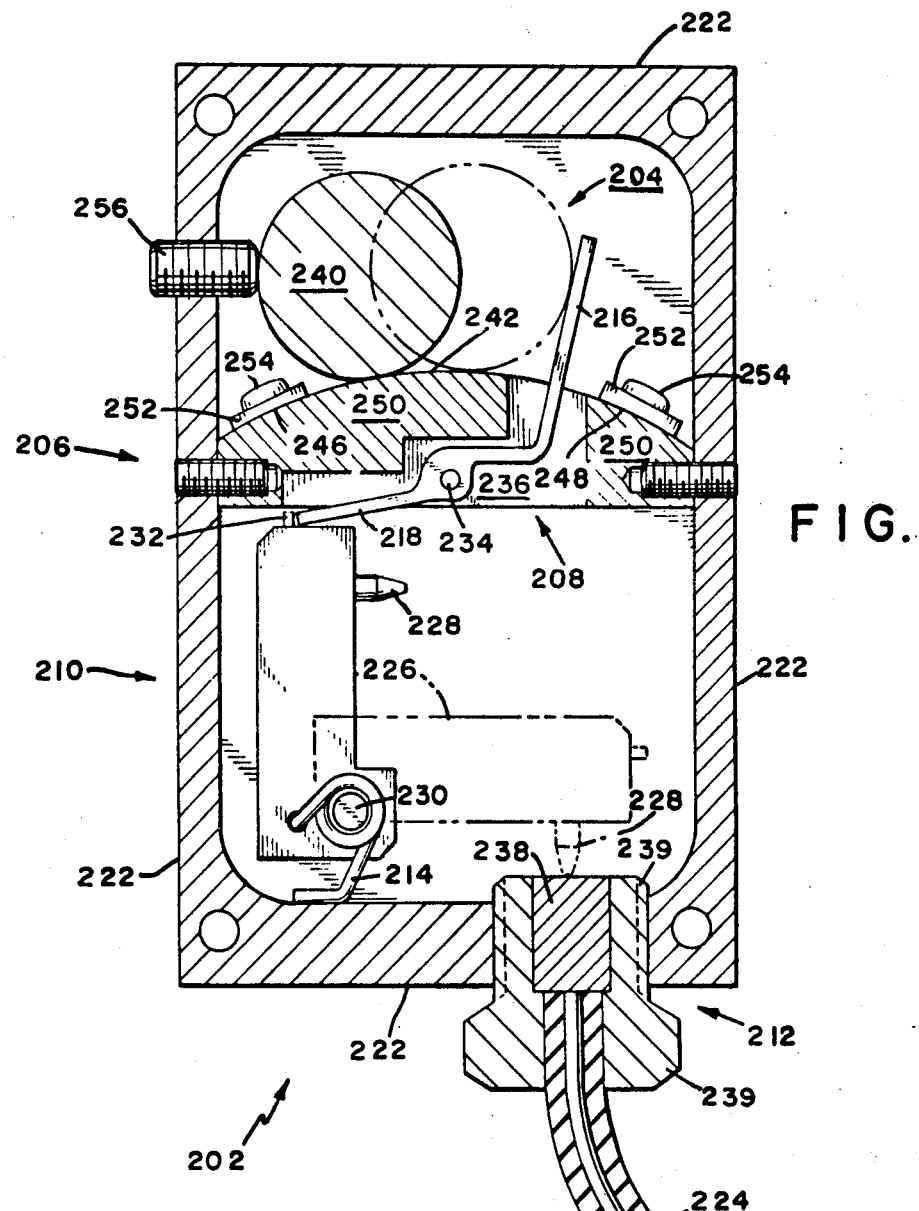
FIG. 9 is a sectional view of a sixth embodiment of the sensor.

Referring to FIG. 9, a sixth embodiment of the sensor 46 is a mechanical sensor, referred to generally by the numeral 202 which includes: a rolamite means 204, a support means 206 for the rolamite means 204, a trigger means 208, a hammer means 210, a primer means 212 and a biasing means 214 for the hammer means 210.

The rolamite means 204 is responsive to acceleration or decleration above a predetermined amount. The rolamite means 204 is mounted on and supported by the support means 206. The support means 206 provides a guide for a path of movement for a portion of the rolamite means 204 during acceleration or deceleration above a predetermined amount. The trigger means 208 is located adjacent to the support means 206 and has a first portion 216 and a second portion 218. The first portion 216 of the trigger means 218 extends into the path of movement for a portion of the rolamite means 204. The hammer means 210 is located adjacent to the trigger means 218 and is releasable by an end of the second portion 218 of the trigger means 208. The primer means 212 is connected to the device to be actuated, such as a pyrotechnic device 220 for inflating an air bag. The primer means 212 is activated by the hammer means 210. The biasing means 214 biases the hammer means 210 toward the primer means 212.

The mechanical sensor 201 further includes a housing 222 and an energy transfer means 224. The housing 222 encloses the rolamite means 204, the support means 206, the trigger means 208, the hammer means 210, the biasing means 214 and at least a portion of the primer means 212. The energy transfer means 224 conveys energy from the primer means 212 to the pyrotechnic device 220.

The hammer means 210 includes: a hammer member 226, a firing pin 228, a hammer pivot point 230 and a stop member 232 for engaging the trigger means 208. The hammer member 226 may have an elongated structure. The firing pin 228 is located adjacent to a first end of the hammer member 226 and the hammer pivot point 230 is located adjacent to an opposing, second end of the hammer member 226.

The trigger means 208 includes: a trigger pivot point 234 located between the first portion 216 and the second portion 218. The first portion 216 extends through an aperture 236 in the support member 206 and extends into the patch along which a portion of the rolamite means 204 moves. The second portion 218 of the trigger means 208 extends to the first end of the hammer member 226. Before actuation of the mechanical sensor 202 by deceleration of a predetermined amount, the end of the second portion 218 of the trigger means 208 holds the first end of the hammer member 226 and other portions of the hammer means 210 in their nonactuated position, shown in solid line in FIG. 9. The second portion 218 of the trigger means 208 holds the hammer member 226 in its nonactuated position by engaging the stop means 232 on the hammer member 226.

The primer means 212 may include: a pyrotechnic primer 238 and a holder 239 for the pyrotechnic primer 238. The pyrotechnic primer 238 is activated by the firing pin 228 of the hammer means 210 when the hammer member 226 moves from its non-actuated position; shown in solid line in FIG. 9, to its actuated position, shown in dash lines in FIG. 9.

Figure 10:
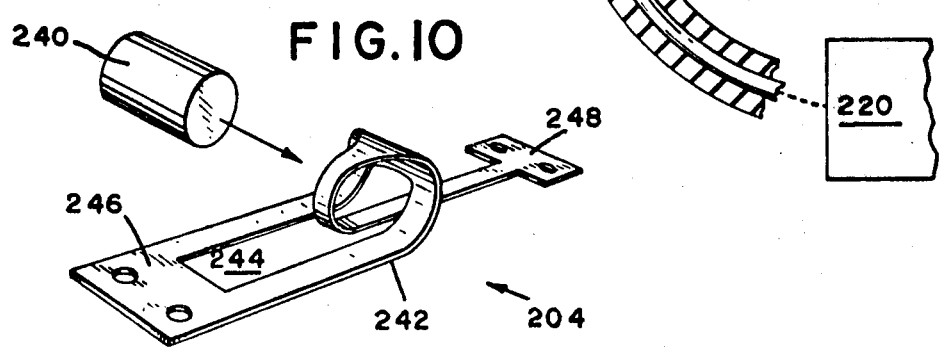
FIG. 10 is a perspective view of components of the sensor shown in FIG. 9.

Referring to FIG. 10, the rolamite means 204 includes a movable mass and a band 242 looped around the mass 240. The band 242 is made of a material such as stainless steel, berylliumcopper or other suitable flat resilient material. The band 242 has a cut-out portion 244 to enable it to be wrapped around the mass 240. The mass 240 may be either solid or hollow and may be constructed of a metal or plastic material. The mass 240 may be in the shape of a cylinder which facilitates rolling movement when deceleration reaches a predetermined amount. The band 242 is looped around the mass 240 so that the ends 246 and 248 extend in opposite directions. Each of the ends 246 and 248 is fixed to the support means 206. When the band 242 is tightly drawn around the mass 240 and secured to the support means 206, it provides a resisting force against which the mass 240 moves in response to acceleration of deceleration above a predetermined amount.

Referring to FIG. 9, the support means 206 includes a support member 250 and two band retainers 252. Each end of the band 242 is positioned between a retainer 252 and the support member 250. A fastening means 254 attaches each retainer 252 and each end of the band 242 at an end of the support member 250. The support member 250 has a top surface which has a curved convex configuration. The mechanical sensor 202 further includes a calibration means 256 which is a screw extending through the housing 222 to the mass 240 of the rolamite means 204 to adjust the non-actuated position of the mass 240, shown in solid line in FIG. 9.

In operation, a deceleration force moves the mass 240 to its actuated position, shown in dashed line in FIG. 9. The mass 240 pivots the first portion 216 of the trigger means 208 clockwise, releasing the hammer means 210. The firing pin 228 actuates the primer 238.

What is claimed is:

1. An integral, modular, self-contained safety apparatus for a vehicle comprising:
    a mounting member for attaching said apparatus to a support inside said vehicle;
    said apparatus comprising:
    a container secured to said mounting member;
    an inflatable safety restraint disposed in said container;
    an inflating means connected to said inflatable restraint for supplying a gas to inflate said restraint;
    a sensor disposed adjacent to said mounting member responsive to a predetermined level of deceleration of said vehicle;
    a pyrotechnic primer disposed adjacent to said mounting member for actuating said inflating means;
    means for firing said pyrotechnic primer in response to said sensor responding to said predetermined level of deceleration; and
    interlock means engaging said support when said mounting means attaches said apparatus to said support for automatically placing said sensor in a condition for actuation when said mounting member attaches said apparatus to said support.

2. The apparatus of claim 1 wherein said sensor comprises a roller band means.

3. The apparatus of claim 2 wherein said roller band means comprises at least one movable mass and a flexible band looped at least partially around said mass.

4. The apparatus of claim 3 wherein said roller band means comprises a pair of rollers, said band looped around a portion of said rollers, a housing having parallel surfaces engaging said band, and means applying tension to said band, one of said surfaces terminating at an edge, plunger means movable with respect to said surfaces and means actuating said plunger means when said rollers move beyond said edge.

5. An integral, modular, self-contained safety apparatus for a vehicle comprising:
    a mounting member for attaching said apparatus to a support inside said vehicle;
    said apparatus comprising:
    a container secured to said mounting member;
    an inflatable safety restraint disposed in said container;
    an inflating means connected to said inflatable restraint for supplying a gas to inflate said restraint upon actuation;
    a sensor responsive to a predetermined level of deceleration of said vehicle, for actuating said inflating means; and
    interlock means engaging said support when said mounting member attaches said apparatus to said support for automatically placing said sensor in a condition for actuation when said mounting member attaches said apparatus to said support.

6. The apparatus of claim 5 wherein said sensor comprises a source of electrical energy, means releasing said energy in response to the presence of said predetermined level of deceleration and means for activating said inflating means in response to release of said electrical energy.

7. The apparatus of claim 6 wherein said source of electrical energy is a piezoelectric device.

8. The apparatus of claim 6 wherein said source of electrical energy comprises a coil and a magnet movable relative to said coil by said energy releasing means.

9. The apparatus of claim 6 wherein said source of electrical energy is a battery, and said means releasing said energy includes a switch connecting said source to said inflating means.

10. The apparatus of claim 5 wherein said sensor comprises a mechanical sensor responsive without any source of electrical energy including:
    a roller band means responsive to said predetermined amount of deceleration;
    a support means upon which said roller band means is mounted and providing a path of movement for a portion of said roller band means during said deceleration;
    a trigger means located adjacent to said support means and extending into said path of movement for a port of said roller band means;
    a hammer means located adjacent to said trigger means and releasable by a portion of said trigger means;
    a pyrotechnic primer for actuating said inflating means;
    said pyrotechnic primer being activated by said hammer means; and
    a biasing means biasing said hammer means towards said primer.

11. The apparatus of claim 5 wherein said sensor comprises a movable means and said interlock means comprises a lever, a first portion of said lever releasably engaging said mass, a second portion of said lever engaging and being moved by said support when said apparatus is attached to said support, movement of said second portion causing release of said mass by said first portion to place said sensor in said condition for actuation.

12. The apparatus of claim 11 wherein said mass comprises a roller band means.

13. The apparatus of claim 5 further comprising means for automatically re-engaging said interlock means upon removal of said mounting member from said support.

14. The apparatus of claim 5 including a pyrotechnic primer for actuating said inflating means.

* * * * *

UNITED STATES PATENT AND TRADEMARK OFFICE
CERTIFICATE OF CORRECTION

PATENT NO. : 4,167,276
DATED : September 11, 1979
INVENTOR(S) : L.E. Bell, B.K. Hamilton, W.R. Dickie, R.M. Wulbrecht, and D.G. Radke It is certified that error appears in the above-identified patent and that said Letters Patent are hereby corrected as shown below:

Column 1, line 12, "retraint" should read -- restraint --;

line 13, "inflages" should read -- inflates --;

line 17, "retraint" should read -- restraint --.

Column 2, line 50, "fragible" should read -- frangible --.

Column 7, line 9, "of" should read -- or --.

Column 8, line 52, "means", first occurrence, should read

-- mass --.

Signed and Sealed this

Nineteenth Day of February 1980

[SEAL]

*Attest:*

SIDNEY A. DIAMOND

*Attesting Officer*     *Commissioner of Patents and Trademarks*